(12) United States Patent
Dodd et al.

(10) Patent No.: US 7,160,591 B1
(45) Date of Patent: Jan. 9, 2007

(54) HEAT TRANSFER ELEMENT

(75) Inventors: Keith Herbert Dodd, Gnosall (GB); Nicholas Jason Welton, Solihull (GB); Christopher Barry Price, Shrewsbury (GB)

(73) Assignee: Security Composites Limited, Shropshire (GB)

( * ) Notice: Subject to any disclaimer, the term of this patent is extended or adjusted under 35 U.S.C. 154(b) by 0 days.

(21) Appl. No.: 09/890,860

(22) PCT Filed: Feb. 7, 2000

(86) PCT No.: PCT/GB00/00363

§ 371 (c)(1),
(2), (4) Date: Oct. 16, 2001

(87) PCT Pub. No.: WO00/47664

PCT Pub. Date: Aug. 17, 2000

(30) Foreign Application Priority Data

Feb. 8, 1999 (GB) .................................. 9902758.3

(51) Int. Cl.
  *F16L 9/12* (2006.01)
  *F16L 9/14* (2006.01)
  *F16L 9/16* (2006.01)
  *B32B 1/08* (2006.01)

(52) U.S. Cl. .................. 428/36.9; 428/34.1; 428/34.4; 428/34.5; 428/34.6; 428/34.7; 428/35.7; 428/35.8; 428/36.3; 428/36.91

(58) Field of Classification Search ............... 428/34.1, 428/34.4, 34.5, 34.6, 34.7, 35.7, 35.8, 36.1, 428/36.3, 36.4, 36.9, 36.91, 373, 374; 165/133, 165/134.1
See application file for complete search history.

(56) References Cited

U.S. PATENT DOCUMENTS

| | | | | |
|---|---|---|---|---|
| 4,080,357 A | * | 3/1978 | Gergen et al. .............. | 524/505 |
| 4,800,113 A | * | 1/1989 | O'Connor ................... | 428/175 |
| 4,911,227 A | * | 3/1990 | Saito et al. ................... | 165/10 |
| 4,940,617 A | * | 7/1990 | Baurmeister ............... | 428/36.3 |
| 5,000,875 A | * | 3/1991 | Kolouch ..................... | 252/511 |
| 5,036,903 A | | 8/1991 | Shook .......................... | 165/1 |
| 5,211,220 A | * | 5/1993 | Swozil et al. ............... | 165/133 |
| 5,229,460 A | * | 7/1993 | Yousuf et al. .............. | 525/198 |
| 5,409,777 A | | 4/1995 | Kennedy et al. ......... | 428/411.1 |
| 5,425,981 A | * | 6/1995 | Bruning et al. ............. | 428/198 |

FOREIGN PATENT DOCUMENTS

| | | |
|---|---|---|
| EP | 0 445 523 | 9/1991 |
| EP | 0 515 030 | 11/1992 |
| GB | 1107843 | 5/1965 |
| GB | 1 468 410 | 3/1977 |
| WO | WO 99/35458 | 7/1999 |

OTHER PUBLICATIONS

Merriam-Webster Online Dictionary, entry for "monolithic" and "monolith".*
Patent Abstracts of Japan, vol. 012, No. 471, Dec. 9, 1988 and JP 63 194195, Aug. 11, 1986.

* cited by examiner

*Primary Examiner*—Jennifer C. McNeil
*Assistant Examiner*—Walter B. Aughenbaugh
(74) *Attorney, Agent, or Firm*—Nixon & Vanderhye, P.C.

(57) ABSTRACT

An elongate tubular heat transfer element having a longitudinal tube axis that runs through the hollow interior of the heat transfer element. The heat transfer element includes a wall of monolithic construction having an outer surface and an inner surface. The wall is formed from a composite material including a matrix and rovings embedded in the matrix. The composite material is in contact with the hollow interior such that the inner surface determines a boundary of the hollow interior which extends longitudinally along the axis of the heat transfer element. The matrix is of a fluoropolymer having embedded therein rovings of boron-free chemically resistant glass fibres. The rovings include from about 20% to about 60% by volume based upon the volume of the composite material, rovings that extend longitudinally in a lengthwise direction parallel to the axis of the heat transfer element and rovings that extend spirally around the axis.

13 Claims, No Drawings

HEAT TRANSFER ELEMENT

BACKGROUND OF THE INVENTION

1. Field of the Invention

The present invention relates to a heat transfer element, more particularly to a heat transfer element for use in a power generating station or a chemical processing plant. Such a heat transfer element can be in the form of a sheet or tube, for example.

2. Background

There are currently over six hundred power generating stations in the European Union. An important feature of these stations is the provision of heat exchangers consisting of a number of radiant panels which serve to transfer heat within the station. There may be around 30,000 square meters of radiant panels in a single heat exchanger. A power generating station may use up to twelve or more heat exchangers.

The radiant panels should not only serve their primary heat transfer function, they should also be robust to withstand the conditions in which they operate. Thus, not only are physical conditions harsh, with hot air and steam at up to about 150° C. flowing at high speed past the panels, but also corrosive chemicals, such as sulphurous and nitrous acids, are present in the air stream. Furthermore, the panels may become clogged with soot or debris, which may also impair their function. The panels are also subjected to rapid thermal cycling.

Conventionally, heat transfer elements used to make the radiant panels have been manufactured from a metal with a vitreous enamel coating. The metal base material, conveniently of mild steel, provides the necessary structural strength to the element and also the required thermal conductivity. A coating of vitreous enamel protects the metal base from the corrosive effects of the surrounding environment.

Recently, attempts have been made to provide heat transfer elements by spraying a metal base with a fluoropolymer. However, the resulting composite element is not economical to manufacture.

In U.S. Pat. No. 4,461,347 there is proposed a heat exchanger assembly comprising coaxially arranged inner and outer pipes. The inner pipe can be formed of high strength metal and ensheathed by an extruded heat shrinkable plastics tube of non-reactive material, such as polytetrafluoroethylene or polypropylene.

A plate heat exchanger comprising at least three plate elements consisting of graphite and a fluoropolymer, such as polyvinylidene fluoride is disclosed in European Patent Specification No. 0 203 213 A1.

British Patent Specification No. 2 255 148A teaches a structurally composite metal and plastics tube in which the metal forms a tubular core having openings throughout its length occupying at least 5% of its total surface area while the plastics material forms imperforate inner and outer layers, each at least 0.1 mm thick, covering the inside and outside of the metal core and integrally joined through the openings.

There is a need to improve upon the performance of heat transfer elements in power generating stations. Thus, it would be desirable to provide a heat transfer element with improved heat transfer properties, with improved anti-fouling properties, with improved resistance to physical and chemical corrosion, and with improved mechanical properties.

All of these desiderata are objects of the present invention.

A further object of the present invention is to provide a heat transfer element with the improved properties referred to above but which is relatively economical to manufacture.

SUMMARY OF THE INVENTION

According to one aspect of the present invention there is provided a heat transfer element comprising a polymer matrix having a fibrous material interspersed therein, said heat transfer element comprising a fluoropolymer at least on an outer surface thereof, the interspersion of the fibrous material within the polymer matrix providing rigidity to the heat transfer element, a thermally conductive material being distributed within the heat transfer element.

The fibrous material may comprise metal fibres, such as iron, steel, or stainless steel fibres, in which case additional thermally conductive material is not necessary. However, it is also possible, when using metal fibres, to add a particulate metal such as particles of iron, steel, stainless steel or copper.

The fibrous material may alternatively comprise glass fibres, preferably glass fibres made from a chemically resistant glass, for example boron-free glass fibres, or a mixture of glass fibres and fibres of a plastics material, such as polypropylene or a fluoropolymer.

It is also contemplated that the fibrous material can comprise glass fibres coated with a thermally conductive material.

The fibrous material can be incorporated in any convenient form. Preferably the fibrous material comprises continuous fibres in one of the forms conventionally used for making fibre reinforced articles. Examples include randomly distributed or closely mingled fibres, or rovings braided to form continuous tubes, formed into preimpregnated tapes, or woven into panels. The rovings may themselves be pre-coated with, for example, a plastics material. One form of continuous tube comprises loosely commingled or interwoven rovings, for example loosely interwoven glass fibre rovings, wherein the individual rovings extend at a small angle, for example about 10° to about 15°, to the tube axis. Such glass fibres may be intermingled with polypropylene fibres or with fluoropolymer fibres or coated with polypropylene powder or polyvinylidene powder. Another form of fibrous material which can be used in the practice of the invention comprises a narrow band of parallel fibres as warp interwoven with a similar narrow band of parallel fibres as weft, with the warp and weft crossing each other substantially at right angles to one another. Such narrow bands may be, for example, from about 0.2 cm to about 2 cm wide.

It is also possible to use a mixture of metal and glass fibres as the fibrous material.

Thus one preferred from of heat transfer element according to the invention comprises:

a polymer sheet having a fibrous material interspersed therein and comprising a fluoropolymer at least on an outer surface of the sheet, the interspersion of the fibrous material within the sheet providing rigidity to the element; and a thermally conductive material distributed within the heat transfer element.

Heat transfer elements according to the invention have a number of significant advantages over conventional heat transfer elements, in particular the conventional elements used to form the radiant panels of power generating stations.

The provision of a fluoropolymer sheet significantly improves the anti-fouling properties of the heat transfer elements of the invention. Fluoropolymers have low surface energy and good lubricity and are therefore able to resist fouling by soot and debris to a greater extent than has been the case with conventional ceramic materials. Furthermore, fluoropolymers tend to be extremely resistant to chemical attack and are well adapted to withstand the corrosive action of the sulphurous and nitrous acids present in the air stream flowing past the elements when in use. This resistance to chemical attack prevents surface solvation, which could otherwise worsen the flow characteristics of the surface.

DETAILED DESCRIPTION OF THE INVENTION

In one embodiment of the invention, the fibrous material is itself a thermally conductive material, for example a metal such as iron, mild steel, or stainless steel.

One advantage of using a thermally conductive material as the fibrous material is that it may not then be necessary to provide any further thermally conductive material in the element. In this case, the fibrous material will itself serve as the sole thermally conductive material in the element. However, it may in some cases be preferred to distribute a thermally conductive material within the element by means other than the fibrous material. Thus, in one preferred embodiment of the invention, the thermally conductive material comprises a particulate or filamented material, for example, a particulate or filamented metal such as iron or steel. This particulate or filamented material may be mixed with the fluoropolymer prior to compression moulding or lamination of the fluoropolymer onto the fibrous material. The resulting heat transfer element according to the invention will comprise a fibrous material, which may if desired be of metal or some other thermally conductive material but which may alternatively be or include a thermal insulator or a material having a relatively low thermal conductivity, such as glass fibres, preferably made from chemically resistant glass such as boron-free glass, and a fluoropolymer sheet having the thermally conductive particulate or filamented material distributed within the fluoropolymer sheet or polymer matrix.

Although glass fibres exhibit relatively low thermal conductivity properties, it has been found that adequate thermal conductivity can be imparted to the heat transfer elements of the invention by utilising high volume proportions of glass fibres, for example up to about 60% by volume of the heat transfer element. The use of such levels of glass fibres is economically advantageous because the polyvinylidene fluoride or other fluoropolymer is typically about 6 times more expensive than glass fibres. Hence the invention enables the production of heat transfer elements in a relatively economical manner, even though utilising a relatively expensive fluoropolymer in its manufacture.

In general the desired heat conductivity properties can be achieved by varying the loading of the fibrous material and/or by mixing a filler with good thermal conductivity properties such as metal fibres or metal powder with a material with lower thermal conductivity such as glass fibres. Typically the amount of glass fibres can range from about 20% by volume to about 60% by volume of the heat transfer element. The proportion of metal fibres or particles used can range up to about 25% by volume but is usually not greater than about 20% by volume of the heat transfer element.

The polymer sheet or matrix may consist entirely of a fluoropolymer or admixtures of a fluoropolymer with compatible thermoplastic polymers, antioxidants and other additives. In this case the fibrous material is interspersed within the fluoropolymer. This can be achieved by laminating a pad of fibrous material, for example a pad of chemically resistant glass fibres or metal fibres, between two sheets or films of fluoropolymer. However, in an alternative embodiment of the invention, the polymer sheet may comprise an underlayer of a plastics material, in which the fibrous material is interspersed, and an overlayer of fluoropolymer. The plastics material is preferably an acrylic polymer or alloy. This arrangement may be desirable for economic reasons. When the plastics material, such as a relatively inexpensive acrylic polymer, is laminated or compression moulded onto the fibrous material, the thermoplastic acrylic polymer flows into and around the fibres and provides a relatively cheap filler onto which the fluoropolymer may be coated. Of course, the lamination or compression moulding of the fibrous material with the inexpensive acrylic filler and the fluoropolymer may be done simultaneously by applying heat and pressure to a sandwich having an outer film of fluoropolymer, an intermediate layer of acrylic polymer and an inner layer of fibrous material. In this case, the fibrous material may become interspersed in both the acrylic polymer and the fluoropolymer.

The use of compression moulding or lamination, for example continuous belt lamination, to form the heat transfer element is preferred, particularly when forming the heat transfer element as a sheet. However, it may sometimes be appropriate, for example when an inexpensive acrylic polymer is used, to powder coat the fluoropolymer onto a base portion formed after cooling of the acrylic base sheet with interspersed fibrous material. However, the use of compression moulding or lamination allows the manufacturer to minimise the thickness of the coating, thus improving the thermal transfer properties of the element and allowing cost-effective manufacture of the element by minimising the quantity of the expensive fluoropolymer used therein.

Typically a heat transfer element in the form of a sheet has an overall thickness of from about 0.4 mm to about 1.2 mm.

The heat transfer element of the invention may also be formed as a tube by extrusion of a fluoropolymer melt and interspersed fibrous material. Other conventional methods of forming fibre reinforced plastics tubes may be used. For example, a tube can be formed by spirally winding one or more layers of a fibre reinforced plastics tape on to a mandrel and compressing or fusing the tape portions one to another as appropriate. If more than one layer of tape is used then the fibre directions of the two layers can be different. If the tape does not itself comprise a fluoropolymer, then a fluoropolymer tape or film can simultaneously or thereafter be applied to the fibre reinforced layer or layers and laminated thereto by application of heat and/or pressure. If the fibrous reinforcement is a poor conductor, for example glass fibres, then metal powder or metal fibres can be incorporated either in the fibre reinforced layer or in the fluoropolymer coating layer.

Suitable equipment for manufacture of tubular heat transfer elements in accordance with the invention can be achieved using, for example technology developed by Automated Dynamics of 407 Front Street, Schenectady, N.Y. 12305, United States of America in order to effect fibre placement during tube formation, or the discontinuous double pressing operation as provided by BST Beratung und System Technik GmbH of Am Flughaven 7613, 88406 Friedrichshafen, Germany.

The tube or pipe can be of any convenient cross section such as round, oval or square. It can have fins or other structural features integrally formed therewith. Its diameter can vary within wide limits, for example from about 1 cm up to about 25 cm or more, e.g. about 38 mm. It can have couplings or other fittings integrally moulded therein. The tube or pipe can vary in internal dimensions or wall thickness along its length.

When the heat transfer element of the invention comprises a sheet, it can be bent, corrugated or otherwise formed into a desired shape, using appropriate conditions of heat and/or pressure.

The fluoropolymer used in the present invention is preferably a fluorohydrocarbon polymer, such as polyvinylidene fluoride (PVDF) or a copolymer with at least 80% by weight of vinylidene fluoride and up to 20% by weight of at least one other fluorine based monomer. Suitable fluorine based monomers which may be used with vinylidene fluoride are tetrafluoroethylene, hexafluoropropylene and vinyl fluoride, having the characteristics listed in U.S. Pat. Nos. 4,770,939 and 5,030,394. The fluoropolymer is most preferably PVDF and is commercially available from Atochem North America, Inc. under the trade designation KYNAR 500 PC, KYNAR 710, KYNAR 711 or KYNAR 2800.

The fluoropolymer may be mixed with another thermoplastic polymer. The preferred thermoplastic polymers are acrylic polymers with units derived from acrylates or methacrylates, such as copolymers derived from an alkyl acrylate or alkyl methacrylate, preferably, methyl methacrylate or from at least one other olefinically unsaturated monomer. Acrylic acid and methacrylic acid are also suitable as the other olefinically unsaturated monomer. Advantageously, the copolymers comprise at least 75% by weight of units derivable from an alkyl methacrylate and up to 25% by weight of units derivable from one or more other olefinically unsaturated monomers. The thermoplastic polymer is preferably poly(methyl acrylate) or poly (methyl methacrylate) or an alkyl methacrylate/alkyl acrylate copolymer. These thermoplastic polymers have the characteristics listed in U.S. Pat. Nos. 4,770,939 and 5,030,394 and are commercially available from Rohm & Haas Company under the trade description Acryloid/Paraloid B-44®. These materials are described in U.S. Pat. No. 5,229,460. Another preferred acrylic polymer is available from Atohaas under the trade designation OROGLAS HFI-10.

The use of an acrylic polymer in admixture with the fluoropolymer can improve the wetting properties of the material and thus help to ensure even coating of the fibrous material in the heat exchange element of the invention.

The weight ratio of the fluoropolymer to the thermoplastic acrylic polymer, if used, is preferably in the range of from about 90:10 to 40:60, preferably from about 75:25 to 65:35, for example about 70:30.

A low melting point fluorine-based terpolymer may also be added to the fluoropolymer/thermoplastic acrylic polymer mixture. A terpolymer is a polymer made from three monomers. Such a low melting point terpolymer would have, for example, a melting point of not higher than 150° C. A suitable terpolymer is vinylidene fluoride-tetrafluoroethylene-hexafluoropropylene, having a melting temperature of about 870 to 93° C. and a melt viscosity of about 11,000 to 13,000 Poise at 125° C. The preferred terpolymer is commercially available from Atochem, North America, Inc. under the trade designation KYNAR ADS®. The weight ratio of the fluoropolymer to the terpolymer, if used, is in the range of from about 50:50 to 99:1.

The mixture may also contain other additives, such as corrosion inhibiting pigments, dry flow promoting agents, antioxidants, adhesion promoters and ultra-violet-absorbing materials, although not required. One preferred additive is an antioxidant, such as 2,2-bis[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzene-propanoate, available from Ciba-Geigy under the trade designation Irganox 1010.

The fluoropolymer composition can be formed into a thin film for lamination to the outside of a heat transfer element in accordance with the invention.

In order that the invention may be properly understood and fully carried into effect, a number of preferred embodiments thereof will now be more particularly described in the following Examples:

EXAMPLE 1

A fluoropolymer composition comprising the following ingredients was prepared:

| Raw Materials | % by weight |
|---|---|
| Kynar ™ 710 | 69.3% |
| Paraloid ™ B-44 Beads | 29.7% |
| Irganox ™ 1010 | 1.0% |

The materials were mixed in a high speed MIXACO™ mixer and fed into a twin screw extruder and extruded at about 200° C. The extrudate was quenched in a water bath and then pelletised.

The pelleted composition was extruded through a single screw extruder with a single slot die to form a continuous film with a thickness of around 120 μm.

The resulting film was used to coat a fibrous pad of mild steel by placing a sheet of film on each side of the pad and subjecting the covered pad to a temperature of 200° C. and =a pressure of 0.625 tonnes per square inch (95 bar) in a heating press.

The resulting heat transfer element has a thickness of about 1 mm and has excellent heat transfer, anti-fouling, structural and flow characteristics.

EXAMPLE 2

A film of fluoropolymer coating composition was prepared as described above in Example 1 and was used to coat a fibrous mild steel pad by covering both sides of the pad with film and passing the covered pad through a twin belt laminator. Acetate release sheets were placed over the fluoropolymer film to prevent adherence of the fluoropolymer to the belts of the laminator.

The resulting heat transfer element is approximately 1 mm thick and has excellent heat transfer, anti-fouling, structural and flow characteristics.

EXAMPLE 3

A fluoropolymer coating composition as specified in Example 1 was prepared and mixed with stainless steel filings in a ratio of three parts by weight of the coating composition to one part by weight of stainless steel filings. The resulting composite material was laminated onto a fibre glass pad using the method described in Example 2 to form a heat transfer element having a thickness of about 1 mm with excellent heat transfer, anti-fouling, structural and flow characteristics.

EXAMPLE 4

Examples 1 to 3 were repeated using a fluoropolymer composition of the following ingredients:

| Raw Materials | % by weight |
|---|---|
| Kynar ™ 2800 | 60.00% |
| Oroglas ™ HFI-10 | 40.00% |

In each case, a heat transfer element with excellent heat transfer, anti-fouling, structural and flow characteristics was produced.

EXAMPLE 5

A laminate comprising two pre-manufactured Solex 8008 100% fluoropolymer films, each 0.150 mm thick, and two 110 g/m² Advantex™ pre-manufactured fibrous chemically resistant glass mats were combined together with a fibrous pad of steel approximately 0.6 mm thick by laminating them together in a twin belt laminator using a pressure of less than 5 bar and a temperature of 230° C. The resulting laminate has a thickness of 0.91 mm and has excellent economic performance, and heat transfer, anti-fouling, structural and flow characteristics.

EXAMPLE 6

A pipe is prepared by tape winding preprepared tapes comprising 60% by volume chemically resistant glass fibre together with 40% by volume of Kynar 711. This was obtained in the form of a very fine powder and was coated using a fluidised bed on to the glass fibres and then consolidated using a heated die. The resultant tape was 0.4 mm thick and 20 mm wide and was wound on to a mandrel with 60% of the tape in the length of the pipe and 40% in the inner and outer surfaces of the pipe at an angle of +/−20°. The resultant pipe performed well under test.

The invention claimed is:

1. An elongate tubular heat transfer element having a longitudinal tube axis that runs through the hollow interior of the tubular heat transfer element wherein the tubular heat transfer element comprises a wall of monolithic construction having an outer surface and an inner surface, said wall being formed from a composite material comprising a matrix and rovings embedded in the matrix, wherein the composite material is in contact with the hollow interior, such that the inner surface determines a boundary of the hollow interior which extends longitudinally along the tube axis of the heat transfer element and wherein the matrix consists essentially of a fluoropolymer selected from polyvinylidene fluoride and copolymers of at least 80% by weight, based upon the weight of the copolymer, of vinylidene fluoride and up to 20% by weight, based upon the weight of the copolymer, of at least one other fluorine based monomer selected from tetrafluoroethylene, hexafluoropropylene and vinyl fluoride, and wherein the rovings embedded in the matrix comprise boron-free chemically resistant glass fibres, the rovings comprising from about 20% to about 60% by volume based upon the volume of the composite material and including rovings which extend longitudinally in a lengthwise direction parallel to the tube axis of the tubular heat transfer element and rovings which extend spirally around the tube axis.

2. An elongate tubular heat transfer element according to claim 1, wherein the fluoropolymer is polyvinylidene fluoride.

3. An elongate tubular heat transfer element according to claim 1, further comprising a first layer adjacent the outer surface of the wall, a second layer surrounding the first layer, and at least one other layer intermediate the first and second layers, wherein the first, second and at least one other layers each include a plastics material and rovings embedded in the plastics material, and wherein the rovings of a particular layer all extend substantially in a common direction which is different from the common direction of any adjacent layer, and wherein the common direction is in each case selected from a direction extending spirally around the tube axis and a direction extending longitudinally in a lengthwise direction parallel to the tube axis.

4. An elongate tubular heat transfer element according to claim 1, wherein the wall comprises a first layer adjacent the inner surface, a second layer adjacent the outer surface, and an intermediate layer between said first and second layers, wherein the first, second and intermediate layers each include a plastics material and rovings embedded in the plastics material and wherein the rovings in the first layer of the wall adjacent the inner surface and the rovings in the second layer of the wall adjacent the outer surface each extend spirally around the tube axis and wherein the rovings in the intermediate layer of the wall between the first and second layers extend longitudinally in a lengthwise direction relative to the tube axis of the tubular heat transfer element.

5. An elongate tubular heat transfer element according to claim 4, wherein the rovings in the intermediate layer comprise about 60% of the total rovings and wherein the rovings of the first and second layers together comprise about 40% of the total of all rovings in the heat transfer element.

6. An elongate tubular heat transfer element according to claim 1, wherein the composite material further comprises a particulate metal.

7. An elongate tubular heat transfer element according to claim 1, wherein the composite material further comprises a particulate thermally conductive material.

8. An elongate tubular heat transfer element having a longitudinal tube axis that runs through the hollow interior of the tubular heat transfer element wherein the tubular heat transfer element comprises a wall of monolithic construction having an outer surface and an inner surface, said wall being formed from a composite material comprising a matrix and rovings embedded in the matrix, wherein the composite material is in contact with the hollow interior, such that the inner surface determines a boundary of the hollow interior which extends longitudinally along the tube axis of the heat transfer element and wherein the matrix consists essentially of polyvinylidene fluoride having embedded therein rovings of boron-free chemically resistant glass fibres, the rovings comprising from about 20% to about 60% by volume based upon the volume of the composite material and including rovings which extend longitudinally in a lengthwise direction parallel to the tube axis of the heat transfer element and rovings which extend spirally around the tube axis.

9. An elongate tubular heat transfer element according to claim 8, further comprising a first layer adjacent the outer surface of the wall, a second layer surrounding the first layer, and at least one other layer intermediate the first and second layers, wherein the first, second and at least one other layers each include a plastics material and rovings embedded in the plastics material, and wherein the rovings of a particular layer all extend substantially in a common direction which is different from the common direction of any adjacent layer, and wherein the common direction is in each case selected from a direction extending spirally around the tube axis and a direction extending longitudinally in a lengthwise direction parallel to the tube axis.

10. An elongate tubular heat transfer element according to claim 8, wherein the wall comprises a first layer adjacent the inner surface, a second layer adjacent the outer surface, and an intermediate layer between said first and second layers, wherein the first, second and intermediate layers each include a plastics material and rovings embedded in the plastics material and wherein the rovings in the first layer of the wall adjacent the inner surface and the rovings in the second layer of the wall adjacent the outer surface each extend spirally around the tube axis and wherein the rovings in the intermediate layer of the wall between the first and second layers extend longitudinally in a lengthwise direction relative to the tube axis of the tubular heat transfer element.

11. An elongate tubular heat transfer element according to claim 10, wherein the rovings in the intermediate layer comprise about 60% of the total rovings and wherein the rovings of the first and second layers together comprise about 40% of the total of all rovings in the heat transfer element.

12. An elongate tubular heat transfer element according to claim 8, wherein the composite material further comprises a particulate metal.

13. An elongate tubular heat transfer element according to claim 8, wherein the composite material further comprises a particulate thermally conductive material.

* * * * *